United States Patent
Raghunathan et al.

(10) Patent No.: US 9,184,589 B2
(45) Date of Patent: Nov. 10, 2015

(54) METHOD FOR OPTIMIZING POWER FLOWS IN ELECTRIC POWER NETWORKS

(71) Applicant: Mitsubishi Electric Research Laboratories, Inc., Cambridge, MA (US)

(72) Inventors: Arvind U Raghunathan, Brookline, MA (US); Ajit Gopalakrishnan, Pittsburgh, PA (US); Daniel N Nikovski, Brookline, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 401 days.

(21) Appl. No.: 13/779,206

(22) Filed: Feb. 27, 2013

(65) Prior Publication Data

US 2014/0244059 A1 Aug. 28, 2014

(51) Int. Cl.
  *G05D 3/12* (2006.01)
  *H02J 3/00* (2006.01)
  *G06N 5/00* (2006.01)
  *G06F 1/26* (2006.01)

(52) U.S. Cl.
  CPC . *H02J 3/00* (2013.01); *G06N 5/003* (2013.01); *G06F 1/26* (2013.01)

(58) Field of Classification Search
  CPC ... G06F 2217/78; H02J 2003/007; H02J 3/00; G06Q 10/04; G05B 13/02; G05B 19/41885; G05B 13/042; G06N 5/003; G06N 5/025; G06N 99/005
  See application file for complete search history.

(56) References Cited

U.S. PATENT DOCUMENTS

| | | | |
|---|---|---|---|
| 8,977,524 B2 * | 3/2015 | Legbedji et al. | 703/2 |
| 9,026,259 B2 * | 5/2015 | Zadeh et al. | 700/291 |
| 2012/0209652 A1 * | 8/2012 | Khosla et al. | 705/7.16 |
| 2012/0249092 A1 * | 10/2012 | Krok et al. | 323/209 |
| 2012/0254597 A1 * | 10/2012 | Delling et al. | 712/233 |
| 2013/0091292 A1 * | 4/2013 | Kim et al. | 709/230 |
| 2013/0144451 A1 * | 6/2013 | Kumar et al. | 700/291 |
| 2013/0156758 A1 * | 6/2013 | Lazar et al. | 424/133.1 |
| 2013/0190938 A1 * | 7/2013 | Zadeh et al. | 700/291 |
| 2013/0226538 A1 * | 8/2013 | Donde et al. | 703/2 |
| 2014/0032187 A1 * | 1/2014 | Legbedji et al. | 703/2 |
| 2014/0052301 A1 * | 2/2014 | Raghunathan et al. | 700/286 |
| 2014/0257585 A1 * | 9/2014 | Kubota et al. | 700/291 |

OTHER PUBLICATIONS

Burer et al., "A finite branch-and-bound algorithm for nonconvex quadratic programming via semidefinite relaxations," Springer-Verlag, Dec. 2006.*

(Continued)

*Primary Examiner* — Darrin Dunn
(74) *Attorney, Agent, or Firm* — Dirk Brinkman; Gene Vinokur

(57) ABSTRACT

Power flow in an electric power network is optimized during multiple time periods of operation of the electric power network by solving an optimization problem represented by an objective function by first initializing variables and constraints of a branch and bound (BB) tree, wherein nodes in the BB tree represent feasible regions of the optimization problem. Upper and lower bounds on the objective function are solved using the BB tree. A lowest upper bound and a lowest upper bound are updated. If difference between the lowest lower bound and the lowest upper bound is less than a threshold, the power flow is outputted based on the lowest lower bound and the lowest upper bound.

13 Claims, 6 Drawing Sheets

(56) References Cited

OTHER PUBLICATIONS

Biegler et al., "Global Optimization of Optimal Power Flow Using a Branch & Bound Algorithm," Fiftiteth Annual Allerton Conf., Oct. 2012.*
Gayme et al.,"Optimal power flow with distributed energy storage dynamics," 2011 American Control Conference, Jun. 2011.*
Koenig et al., "An Application of Langrangian Relaxation to Scheduling in Power-Generation Systems," Operation Research, May 1977.*
Gopalakrishnan A et al: "Global 1-15 optimization of Optimal Power Flow using a branch & bound algorithm", 2012 50th Annual Allerton Conference on Communication, Control, and Computing, Oct. 1-5, 2012, Allerton House, U!UC, Illinois, USA, Oct. 1, 2012, pp. 609-616, XP032345053, DO!: 10.1109/Allerton.2012.6483274 ISBN: 978-1-4673-4537-8.
Warrington J et al: "A market mechanism 1-15 for solving multi-period optimal power flow exactly on AC networks with mixed participants", 2012 American Control Conference (ACC 2012), Jun. 27-29, 2012, Montreal, Canada, Jun. 27, 2012, pp. 3101-3107, XP032244911, ISBN: 978-1-4577-1095-7.
Gayme D et al: "Optimal power flow with distributed energy storage dynamics", 2011 American Control Conference (ACC 2011), Jun. 29-Jul. 1, 2011, San Francisco, CA, USA, Jun. 29, 2011, pp. 1536-1542, XP032035180, ISBN: 978-1-4577-0080-4.
Rong A et al: 'An efficient 1-15 envelope-based Branch and Bound algorithm for non-convex combined heat and power production planning', European Journal of Operational Research, vol. 1 . 183, No. 1, Nov. 16, 2007, pp. 412-431, XP025318388, ISSN: 0377-2217, DOI: 10.1016/J. JOR.2006.09.072.
Gopalakrishnan A et al: 'Global 1-15 optimization of multi-period optimal power flow', 2013 American Control Conference (ACC), Jun. 17-19, 2013, Washington, DC, USA, Jun. 17, 2013, pp. 1157-1164, XP032475910, ISSN: 0743-1619 ISBN: 978-1-4799-8177-7 [retrieved on Aug. 14, 2013].
Panciatici P et al: 'Advanced optimization methods for power systems', 2014 Power Systems Computation Conference, Aug. 18-22, 2014, Aug. 18, 2014, pp. 1-18, XP055199994, DOI: 10.1109/PSCC.2014.7038504 ISBN: 978-8-39-358013-2.

\* cited by examiner $Y_{bus}$ is a $|N| \times |N|$ matrix with elements defined as $$Y_{bus}(i,j) = \begin{cases} -y_{ij} \text{ if } (i,j) \in E \\ -y_{ji} \text{ if } (j,i) \in E \\ \sum_{(i,l) \in E} y_{il} + \sum_{(j,i) \in E} y_{ji} \end{cases}$$

$Y_{bus,i} = \zeta_i \zeta_i^T Y_{bus}; Y_{bus,ij} = y_{ij} \zeta_i \zeta_j^T - y_{ij} \zeta_i \zeta_j^T$ $Y_i = \frac{1}{2} \begin{bmatrix} \text{Re}(Y_{bus,i} + Y_{bus,i}^T) & \text{Im}(Y_{bus,i}^T - Y_{bus,i}) \\ \text{Im}(Y_{bus,i} - Y_{bus,i}^T) & \text{Re}(Y_{bus,i} + Y_{bus,i}^T) \end{bmatrix}; \bar{Y}_i = -\frac{1}{2} \begin{bmatrix} \text{Im}(Y_{bus,i} + Y_{bus,i}^T) & \text{Re}(Y_{bus,i}^T - Y_{bus,i}) \\ \text{Re}(Y_{bus,i} - Y_{bus,i}^T) & \text{Im}(Y_{bus,i} + Y_{bus,i}^T) \end{bmatrix}$ $Y_{ij} = \frac{1}{2} \begin{bmatrix} \text{Re}(Y_{bus,ij} + Y_{bus,ij}^T) & \text{Im}(Y_{bus,ij}^T - Y_{bus,ij}) \\ \text{Im}(Y_{bus,ij} - Y_{bus,ij}^T) & \text{Re}(Y_{bus,ij} + Y_{bus,ij}^T) \end{bmatrix}; \bar{Y}_{ij} = -\frac{1}{2} \begin{bmatrix} \text{Im}(Y_{bus,ij} + Y_{bus,ij}^T) & \text{Re}(Y_{bus,ij}^T - Y_{bus,ij}) \\ \text{Re}(Y_{bus,ij} - Y_{bus,ij}^T) & \text{Im}(Y_{bus,ij} + Y_{bus,ij}^T) \end{bmatrix}$ where $\zeta_i$ denotes a vector of size $|N|$ with a 1 at the $i$-th component and zeros elsewhere.

Fig. 8

METHOD FOR OPTIMIZING POWER FLOWS IN ELECTRIC POWER NETWORKS

FIELD OF THE INVENTION

The present invention relates generally to electric power networks, and more particularly to optimizing power flows in the networks including energy storage devices.

BACKGROUND OF THE INVENTION

An electric power network includes buses connected to transmission lines. The buses are locally connected to generators and loads. Optimal power flow (OPF) analysis is often used for monitoring and controlling the operation of the network. The power flow depends, in part, on voltage magnitudes and phase angles. Power flows and voltage levels on the buses are optimized by minimizing an objective function subject to constraints, such as the magnitudes, phases, power transferred, generator capacity, thermal losses, and the like.

Most conventional OPF optimizations:

Use simplifying assumptions, such as small differences between phase angles at buses, to reduce quadratic equalities and inequalities to linear equalities and inequalities. However, such assumptions may not be valid for all networks.

Use nonlinear programming (NLP) to determine a lowest cost per kilowatt hour delivered. However, NLP cannot guarantee the globally optimal voltages and generator levels for efficient operation.

Use a relaxation of OPF to convex optimization, such as second-order cone programming (SOCP). However, such relaxed convex optimizations do not guarantee feasible solutions with a global minimum for the original problem.

Use a relaxation of OPF to semi-definite programming (SDP), which requires changing resistances of lossless lines in the network, restrictions on the network topology or constraints, or require modification of the network to ensure global optimality.

Use a branch and bound (BB) procedure with Lagrangian duality (LD) based lower bounds that do not consider all possible necessary constraints and are considerably slow due to the irregular nature of the optimization problem.

Do not consider that the amount of energy that is stored, charged, or discharged in batteries at any time is critically dependent on the amount that is actually charged or discharged from the batteries at the that time.

Do not consider time dependent changes for equipment, such as step voltage regulators, voltage transformers or capacitor banks are used. These devices are typically expensive and frequent changes in their operations can lead to quick degradation of the equipment and eventually result in dramatic reduction in the life of the device.

Do not consider time dependent changes when power drawn from generating equipment are subject to ramp limits.

Thus, there remains a need to globally optimize an electric power networks considering multiple time periods of optimization in an efficient and expedient manner.

U.S. Pat. No. 6,625,520 describes a system and method for operating an electric power system that determines optimal power flow and available transfer capability of the electric power system based on the optimal power flow. The system derives data associated with an initial phase angle and maximum electric power value of a generator by determining mechanical output and electrical output of a generator, including a generator phase angle defined by a time function with a constraint condition that the generator phase angle does not exceed a preset value.

SUMMARY OF THE INVENTION

The embodiments of the invention provide a method for globally optimizing a power flow in electric power networks during multiple time periods of operation. A spatial branch and bound (BB) procedure ensures that a globally optimal solution is attained. The BB procedure partitions the feasible region of the power flow problem, specifically by partitioning the bound on generation variables and also constraints on voltage magnitudes, which speeds up convergence. A lower bound on the optimal solution is determined by semi-definite programming (SDP), which provides a maximal lower bound. The SDP uses interior point procedures, which bound the computational complexity.

Specifically, power flow in an electric power network is optimized during multiple time periods of operation of the electric power network by solving an optimization problem represented by an objective function by first initializing variables and constraints of a branch and bound (BB) tree, wherein nodes in the BB tree represent feasible regions of the optimization problem.

Upper and lower bounds on the objective function are solved using the BB tree. A lowest upper bound and a lowest upper bound are updated. If difference between the lowest lower bound and the lowest upper bound is less than a threshold, the power flow is outputted based on the lowest lower bound and the lowest upper bound.

To accommodate large problems arising from several periods, a Lagrangian decomposition method is used to solve the lower bounding problem.

BRIEF DESCRIPTION OF THE DRAWINGS

FIG. 8 is a block diagram of matrices used by embodiments of the invention.

DETAILED DESCRIPTION OF THE PREFERRED EMBODIMENTS

Electrical Power Network Topology and Representative Graph

Figure 1:
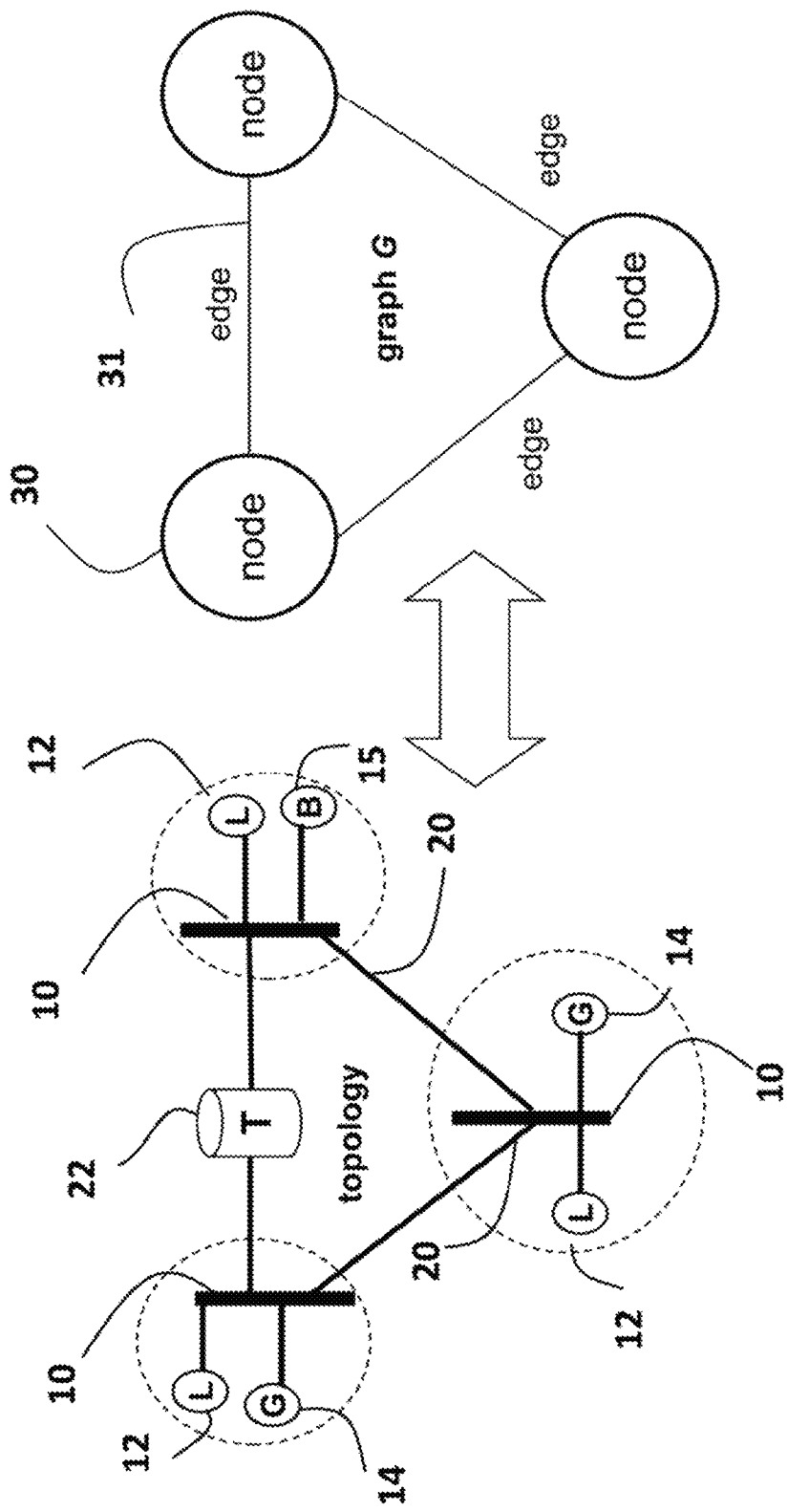
FIG. 1 is a schematic of an electric power network and a graph representing the network that can be used by embodiments of the invention.

FIG. 1 shows a topology of an electric power network that can use embodiments of the invention. The network can include AC components, and DC components connected by convertors. The only requirement is that variables and constraints that control the operation of the network are continuously controllable.

The network includes buses 10 locally connected to loads (L) 12 and generators (G) 14. Additionally, buses are also locally connected to storage devices (B) 15 such as batteries. The buses are interconnected by transmission lines 20. Some of the transmission lines can be connected to transformers (T) 22.

The generators supply active power (measured in, e.g., Mega Watts (MW)), and reactive power (measured in Mega Volt Ampere Reactive (MVar)). The loads consume the power. The power is defined by voltage magnitude and phase angle.

The parameters for the optimization include, but are not limited to, an admittance matrix based on the branch impedance and bus fixed shunt admittance, and the flow capacity ratings, i.e., the maximal total power flow constrained by thermal ratings.

The topology of the network can be represented by a graph G of nodes (generators and connected loads) 30 connected by edges (transmission lines) 31.

Input

Input to the method optimization includes the following:
1) A graph G(N,E) with a set of N nodes connected by a set of E edges (i,j).
2) An admittance of the lines $y_{ij}=g_{ij}+jb_{ij} \forall (i,j) \in E$, where g represents conductance of the line, b represents susceptance (imaginary part of the admittance) of the line with $j=\sqrt{-1}$.
3) Constraints on active power $P_i^{G,min}, P_i^{G,max} i \in N$ that can be produced by the generators, and the reactive power $Q_i^{G,min}, Q_i^{G,max} \forall i \in N$ that can be produced by the generators.
4) Constraints $S_{ij}^{max}, P_{ij}^{max} \forall (i,j) \in E$ on apparent and active power transferred on the lines.
5) Limits $V_i^{min}, V_i^{max} \forall i \in N$ on voltage magnitudes at the buses.
6) Constraints $L_{ij}^{max} \forall (i,j) \in E$ on thermal losses on the lines.

Output

The optimization is performed at during time periods $t=1, \ldots, T$, where each time period has a duration $\Delta t$.

Output of the method includes complex valued voltages $V_i(t) \forall i \in N$ at the buses, active and reactive power levels $P_i^G(t), Q_i^G(t) \forall i \in N$ of the generators, and energy storage device state-of-charge levels $B_i(t) \forall i \in N$. Example devices include, but are not limited to batteries, transformers, capacitors, inductors, and step voltage regulators.

The global optimization uses a decision function $f(P^G, Q^G, V, B)$ that depends on active power generation variables $P^G = (P^G(1), \ldots, P^G(T))$, $P^G(t)=(P_1^G(t), \ldots, P_{|N|}^G(t))$ reactive power generation variables $Q^G = (Q^G(1), \ldots, Q^G(T))$, $Q^G(t)=(Q_1^G(t), \ldots, Q_{|N|}^G(t))$, complex valued voltages $V=(V(1), \ldots, V(T))$, $V(t)=(V_1(t), \ldots, V_{|N|}(t))$, rate of charge of batteries $R=(R(1), \ldots, R(T))$, $R(t)=(R_1(t), \ldots, R_{|N|}(t))$ and battery state-of-charge levels $B=(B(1), \ldots, B(T))$, $B(t)=(B_1(t), \ldots, B_{|N|}(t))$ at the buses.

Multi-Period Optimal Power Flow

In the preferred embodiment, the form of the function $f$ is quadratic and strictly increasing:

$$f(P^G, Q^G, V, B, R) = \sum_{t=1}^{T} \sum_{i \in N} \left( c_{2i}(P_i^G(t))^2 + c_{1i}P_i^G(t) + c_{0i} \right),$$

where c indicates constants, with $c_{2i}, c_{1i} \geq 0 \forall i \in N$.

We use equality constraints, inequality constraints and bounds on the decision variables to model the limits of feasible operation of the network. We model the operation of the electrical network by the equality constraints $$h_n(P^G(t),Q^G(t),V(t),B(t),R(t))=0 \forall n=1,\ldots,Ne, t=1,\ldots,T,$$

where Ne indicates the number of equality constraints.

We model the limits on power generation, limits on voltage magnitude at the buses, ramp limits on the power generation, limits on rate of charge of batteries, limit on state-of-charge of batteries, constraints on the power transferred on the lines and thermal losses ensuring feasible operation as inequality constraints $$g_n(P^G(t),Q^G(t),V(t),B(t),R(t))\leq 0 \forall n=1,\ldots,N_i, t=1,\ldots,T,$$

where $N_i$ indicates the number of inequality constraints.

To determine the voltages at the buses and the powers produced by the generators, we solve the following optimization problem to global optimality:

$$\text{minimize} \sum_{t=1}^{T} f(P^G(t), Q^G(t), V(t), B(t), R(t)) \quad (1)$$

$$\text{subject to } h_n(P^G(t), Q^G(t), V(t), B(t),$$
$$R(t)) = 0 \forall n = 1, \ldots, Ne, t = 1, \ldots, T$$
$$g_n(P^G(t), Q^G(t), V(t), B(t),$$
$$R(t)) \leq 0 \forall n = 1, \ldots, Ni, t = 1, \ldots, T,$$

where $Re(V_i), Im(V_i)$ denote the real and imaginary parts of the complex voltage $V_i$, respectively, and $h_n$ represents equality constraints and $g_n$ represents inequality constraints.

Multi-Period Optimal Power Flow-Constraints

In the preferred embodiment, the equality constraints $$h_n(P^G(t),Q^G(t),V(t),B(t),R(t))=0 \forall n=1,\ldots,Ne, t=1,\ldots,T$$

are represented as

Power flows on the lines $$\left. \begin{array}{l} S_{ij} = V_i(y_{ij}(V_i - V_j))^* \\ S_{ji} = V_j(y_{ij}(V_j - V_i))^* \end{array} \right\} \forall (i, j) \in E$$

Power balances at the buses $$\sum_{j \in N(i)} S_{ij} = S_i^G - S_i^D - R_i \forall i \in N$$

Battery dynamics $$B_i(t+1) = B_i(t) + \eta R_i(t) \Delta t \forall i \in N$$

$$B_i(0) = B_i^0$$

where $S_{ij}(t)=P_{ij}(t)+jQ_{ij}(t)$ denotes the complex valued power transferred from bus i to bus j at time instant t, $S_{ji}(t)=P_{ji}(t)+jQ_{ji}(t)$ denotes the complex valued power transferred from bus j to bus i at time instant t, $(V_i(t))^*$ denotes the complex conjugate of the complex valued variable, $S_i^G(t)=P_i^G(t)+jQ_i^G(t)$ denotes the complex valued power produced by the generators at time instant t, $S_i^D(t)=P_i^D(t)+jQ_i^D(t)$ denotes the complex valued power demands, $R_i(t)$ is the active power used to charge the battery connected to bus i at time instant t, $B_i^0$ is the initial state-of-charge of the battery connected to bus i, $\eta$ is the storage efficiency of the battery. The duration of the time period is $\Delta t$. The variables representing power flow on the lines are used for convenience.

In the preferred embodiment for time period $t=1, \ldots T$, the inequality constraints $$g_n(P^G(t),Q^G(t),V(t),B(t),R(t))=0 \forall n=1,\ldots,Ni, t=1,\ldots,T$$

are represented as follows,
Limit on Apparent Power Transferred on Lines $$\left.\begin{array}{l}|S_{ij}(t)| \le S_{ij}^{max}\\ |S_{ji}(t)| \le S_{ij}^{max}\end{array}\right\} \forall\, (i,j) \in E$$

Limit on Active Power Transferred on Lines $$\left.\begin{array}{l}Re(S_{ij}(t)) \le P_{ij}^{max}\\ Re(S_{ji}(t)) \le P_{ij}^{max}\end{array}\right\} \forall\, (i,j) \in E$$

Limit on Thermal Loss on Lines $$Re(S_{ij}(t)+S_{ij}(t)) \le L_{ij}^{max} \forall (i,j) \in E$$

Limit of Power Generation $$P_i^{G,min} \le P_i^G(t) \le P_i^{G,max}, Q_i^{G,min} \le Q_i^G(t) \le Q_i^{G,max} \forall i \in N$$

Limit on Voltage Magnitude $$V_i^{min} \le \sqrt{Re(V_i(t))^2 + Im(V_i(t))^2} \le V_i^{max} \forall i \in N$$

Limit on State-of-Charge of Batteries $$B_i^{min} \le B_i(t) \le B_i^{max} \forall i \in N$$

Limit on Rate of Charge or Discharge of Batteries $$R_i^{min} \le R_i(t) \le R_i^{max} \forall i \in N$$

and for time periods t=1, ..., T−1.

Ramp Limit on Generator Power Generation $$\Delta P_i^{min} \le P_i^G(t+1) - P_i^G(t) \le \Delta P_i^{max} \forall i \in N$$

$$\Delta Q_i^{min} \le Q_i^G(t+1) - Q_i^G(t) \le \Delta Q_i^{max} \forall i \in N$$

Branch and Bound

Figure 2:
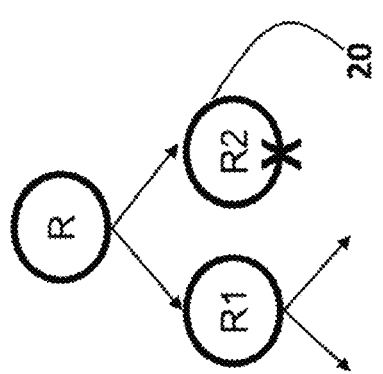
FIG. 2 is schematic of a branch and bound tree used by embodiments of the invention.

As shown in FIG. 2, we use a branch and bound (BB) procedure to search a spatial BB tree 200. The tree includes a root node R, and after partitioning, child nodes R1 and R2. The tree is used to determine the global minimum for the OPF by constructing a convex relaxation of the feasible region R associated with the OPF (1), that is easy to solve and provides a lower bound (L) on the optimal objective function value.

Figure 3:
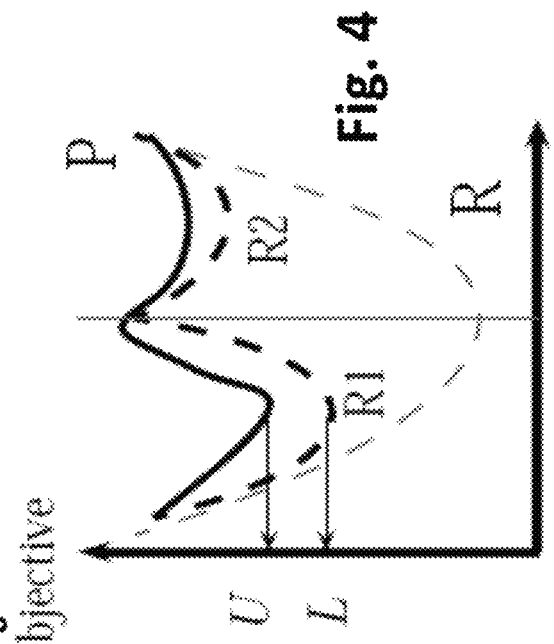
FIG. 3 is a graph of upper and lower bounds used by embodiments of the invention.

As shown in FIG. 3, the upper bound (U) can be determined by using local minimization, which also yields a feasible solution. The steps used by the method are described with reference to FIG. 7 below.

The BB updates the lowest upper bound ($U^{best}$), if $U<U^{best}$. The BB updates the lowest lower bound ($L^{best}$) based on the nodes in the tree that are to be analyzed and lower bound obtained for the current node (L). For nodes in BB tree that have not been solved, an estimate of the lower bound is used. This is typically the lower bound value of the parent node from which it was derived. If ($U^{best} - L^{best}$), or optionally ($U^{best} - L^{best})/U^{best}$, is less than some predetermined threshold τ, then the BB procedure terminates with the current upper bounding solution.

Otherwise, if (U−L), or (U−L)/U or ($U^{best}$−L) is less than some predetermined threshold τ, then the current node is deleted from the BB tree and another node from the BB tree is selected to update/improve the lower and upper bound using the solving steps.

Figure 4:
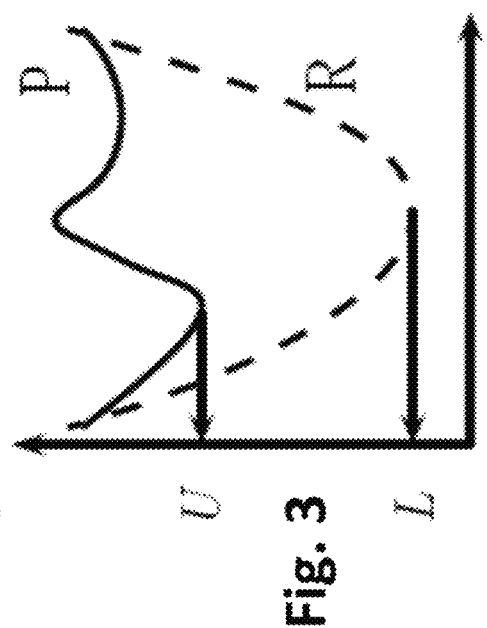
FIG. 4 is a graph of optimized bounds according to embodiments of the invention.

Otherwise as shown in FIG. 4, the feasible region R is partitioned into R1 and R2, and the BB procedure is repeated, and so forth. In other words, if there is an optimality gap, then the feasible region is partitioned into two sub-regions, over which the BB procedure is repeated. Nodes are deleted (in branch and bound terms "fathomed" X) when the lower bound L is greater than the current best upper bound, see FIG. 2.

The BB procedure terminates when all nodes have been processed. In that case, the best upper bounding solution is returned as the globally optimal solution.

Figure 5:
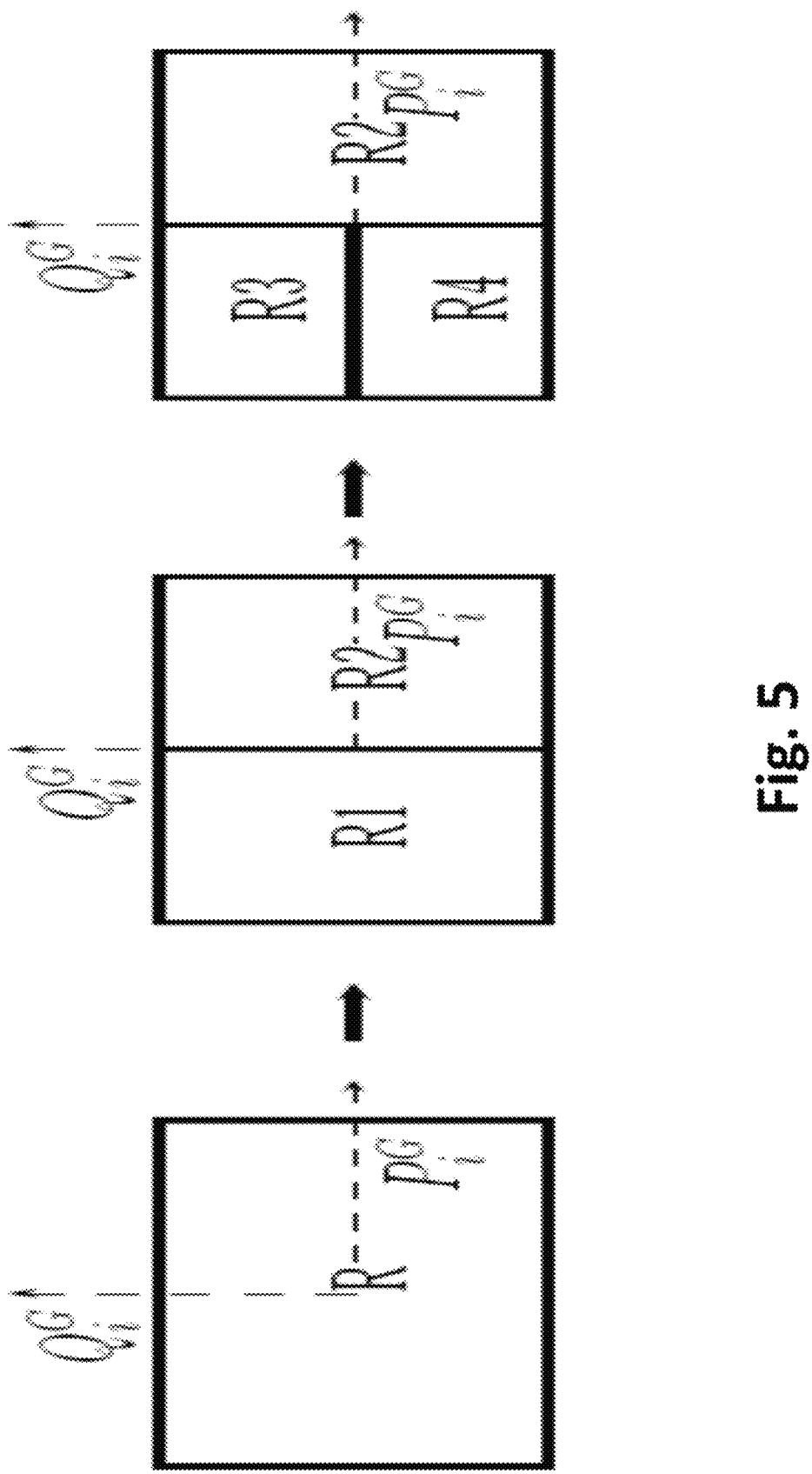
FIG. 5 is a schematic of a rectangular partitioning according to embodiments of the invention.

As shown in FIG. 5, the partitioning of the feasible region can be accomplished by rectangular bisection on $P_i^G$ or $Q_i^G$ which in the stated problem correspond to a particular time-instant t.

Figure 6:
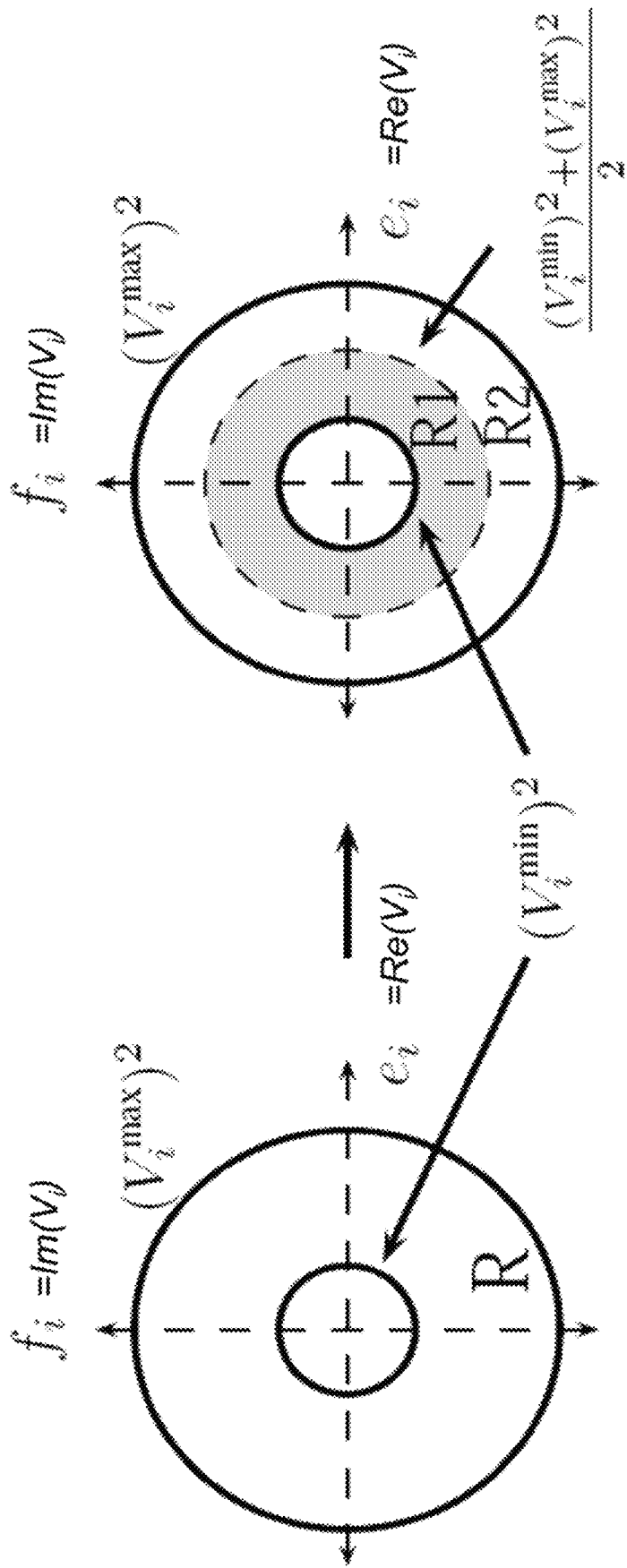
FIG. 6 is a schematic of a radial partitioning according to embodiments of the invention.

FIG. 6 shows a radial bisection on the voltage magnitudes $(e_i^2 + f_i^2)^{0.5}$ which in the stated problem correspond to a particular time-instant t.

The example optimization described herein is a minimization. However, it should be understood, the problem can also be posed as a maximization by reversing the sign of the objective function.

Semidefinite Program Based Lower Bound for Multi-Period Optimal Power Flow

The lower bound for OPF (1) is obtained by solving a semidefinite (SDP) relaxation of the OPF. The SDP that is solved is given by:

minimize $F(P^G, Q^G, W, B, R)$ subject to $H_n(P^G(t), Q^G(t), W(t), B(t), R(t)) = 0 \forall n = 1, \ldots, Ne, t=1, \ldots, T$ $G_n(P^G(t), Q^G(t), W(t), B(t), R(t)) \le 0 \forall n = 1, \ldots, Ni, t=1, \ldots, T$ $(V_i^{min})^2 \le Tr(M_i W(t)) \le (V_i^{max})^2 \forall i \in N$ $W(t) \succeq 0, W(t)$ is $2|N| \times 2|N|$ symmetric matrix $B_i(t+1) = B_i(t) + \eta R_i(t) \Delta t \forall i \in N$ $\Delta P_i^{min} \le P_i^G(t+1) - P_i^G(t) \le \Delta P_i^{max} \forall i \in N$ $\Delta Q_i^{min} \le Q_i^G(t+1) - Q_i^G(t) \le \Delta Q_i^{max} \forall i \in N,$ (2)

where $W(t) \succeq 0$ denotes that matrix W(t) must be positive semidefinite, the matrix operator Tr( ) is defined as $$Tr(AB) = \sum_{n=1}^{|N|} \sum_{m=1}^{|N|} A_{n,m} B_{m,n}$$

and the matrix $M_i$ is defined as $$M_i = \begin{bmatrix} \zeta_i \zeta_i^T & 0 \\ 0 & \zeta_i \zeta_i^T \end{bmatrix},$$

where $\zeta_i$ denotes a vector of size |N| with a 1 at the i-th component and zero elsewhere.

The matrix W(t) is a relaxation of the outer vector product of the voltage variable vector, $$\begin{bmatrix} Re(V(t)) \\ Im(V(t)) \end{bmatrix} [Re(V(t))\; Im(V(t))].$$

In the preferred embodiment, the objective function is, $$F(P^G, Q^G, V, B, R) = \sum_{t=1}^{T}\sum_{i \in N}(c_{2i}(P_i^G(t))^2 + c_{1i}P_i^G(t) + c_{0i}).  \quad 5$$

The equality constraints in the semidefinite relaxation (Eq. 2) are written as, $$\left.\begin{array}{l}P_{ij}(t) = Tr(Y_{ij}W(t))\\Q_{ij}(t) = Tr(\overline{Y}_{ij}W(t))\\P_{ji}(t) = Tr(Y_{ji}W(t))\\Q_{ji}(t) = Tr(\overline{Y}_{ji}W(t))\end{array}\right\} \forall\,(i,j) \in E$$

$$P_i^G(t) - P_i^D(t) - R_i(t) = Tr(Y_iW(t))\forall\,i \in N$$
$$Q_i^G(t) - Q_i^D(t) = Tr(\overline{Y}_iW(t))\forall\,i \in N,$$

where, the matrices $Y_{ij}, Y_{ji}, Y_i, \overline{Y}_i$ are defined as shown in FIG. 8

Lagrangian Decomposition Based Lower Bound for the Multi-Period Optimal Power Flow The SDP relaxations of the Multi-period Optimal Power Flow problem tend to be large scale problems. Therefore, decomposition methods are necessary to solve the problems effectively. The Lagrangian decomposition is used for the Multi-period Optimal Power Flow problem by dualizing only the time coupled constraints in equation (2). The constraints are the dynamics equation for the batteries and the ramp limits for the generator's power generation. The dual problem is, $$L^{LD}(\tau,\underline{\rho},\overline{\rho},\underline{\sigma},\overline{\sigma}) = \min_{P^G,Q^G,W,B} L(P^G, Q^G, W, B, \tau, \underline{\rho}, \overline{\rho}, \underline{\sigma}, \overline{\sigma})$$

subject to
Constraints in (2) other than battery dynamics and ramp limits for generators $$(\underline{\rho}(t),\overline{\rho}(t),\underline{\sigma}(t),\overline{\sigma}(t))\geq 0\forall t=1,\ldots,T-1\tau(t)\text{ unrestricted}$$
$$\forall t=1,\ldots,T. \quad (3)$$

where, $\tau_i(t)$ is the multiplier for the battery dynamics equation in equation (2), and $$\tau(t)=(\tau_1(t),\ldots,\tau_{|N|}(t)), \tau=(\tau(1),\ldots,\tau(T)), \underline{\rho}_i(t),\overline{\rho}_i(t)$$

are the multipliers for the active power ramp lower and upper limits for generators in equation (2) and $$\underline{\rho}(t)=(\underline{\rho}_1(t),\ldots,\underline{\rho}_{|N|}(t)),\underline{\rho}=(\underline{\rho}(1),\ldots,\underline{\rho}(T)),$$

and $\underline{\sigma}_i(t),\overline{\sigma}_i(t)$ are the multipliers for the reactive power ramp lower and upper limits for generators in equation (2), $$\underline{\sigma}(t)=(\underline{\sigma}_1(t),\ldots,\underline{\sigma}_{|N|}(t)),\underline{\sigma}=(\underline{\sigma}(1),\ldots,\underline{\sigma}(T)),$$

$$\overline{\sigma}(t)=(\overline{\sigma}_1(t),\ldots,\overline{\sigma}_{|N|}(t)),\overline{\sigma}=(\overline{\sigma}(1),\ldots,\overline{\sigma}(T))$$

and the objective function is defined as $$L(P^G, Q^G, W, B, \tau, \underline{\rho}, \overline{\rho}, \underline{\sigma}, \overline{\sigma}) =$$

$$\sum_{t=1}^{T}\sum_{i\in N}\left(\begin{array}{l}c_{2i}(P_i^G(t))^2 + c_{1i}P_i^G(t) + c_{0i} +\\\tau_i(t)(B_i(t+1) - B_i(t) - \eta R_i(t)\Delta t)\end{array}\right) +$$

$$\sum_{t=1}^{T}\sum_{i\in N}\left(\begin{array}{l}\underline{\rho}_i(t)(\Delta P_i^{min} - P_i^G(t+1) + P_i^G(t)) +\\\overline{\rho}_i(t)(P_i^G(t+1) - P_i^G(t) - \Delta P_i^{max}) +\\\underline{\sigma}_i(t)(\Delta Q_i^{min} - Q_i^G(t+1) + Q_i^G(t)) +\\\overline{\sigma}_i(t)(Q_i^G(t+1) - Q_i^G(t) - \Delta Q_i^{max})\end{array}\right).$$

The above objective function and the constraints in equation (3), which is partial Lagrangian, is decoupled by time. Thus, instead of solving a single large problem in equation (2), we decouple the optimization problem into T smaller SDPs. To obtain the best possible value of the partial Lagrangian dual function, the following optimization problem is solved, $$\max L^{LD}(\xi) \quad (4)$$

subject to $\xi_{in} \geq 0, \xi_{eq}$ free, where $\xi_{eq}=\tau, \xi_{in}=(\underline{\rho}, \overline{\rho}, \underline{\sigma}, \overline{\sigma})$. This is a non-smooth concave maximization problem, which can be solved using a projected subgradient method. At each iteration of the subgradient method T smaller SDP's are solved and the multipliers $\xi$ are updated using a simple projected subgradient update. However, the subgradient method does not guarantee ascent, and it can take a large number of iterations before the optimal multipliers are found. Hence, the method is usually terminated after a predetermined number of iterations. The optimal value of equation (4) provides the lower bound L in the method.

The maximization problem which iterates on $\xi$ is solved using a subgradient procedure as, $$\xi_{eq}^{k+1}=\xi_{eq}^{k}+s^k g_{eq}^{k}, \xi_{in}^{k+1}=[\xi_{in}^{k}+s^k g_{in}^{k}]^+$$

where [ ]$^+$ denotes the projection on to the nonnegative orthant $s^k$ is a step size.

$g_{eq}^{k}$ denotes the residual of equality constraints that are dualized $g_{in}^{k}$ denotes the residual of inequality constraints that are dualized.

The maximization problem can also be solved using a bundle method or any other nonsmooth optimization procedure. When the lower and upper bounds for power generation variables and voltage magnitudes are updated as described below, the appropriate values are used in the subproblems (i), (ii) and (iii) described above.

Figure 7:
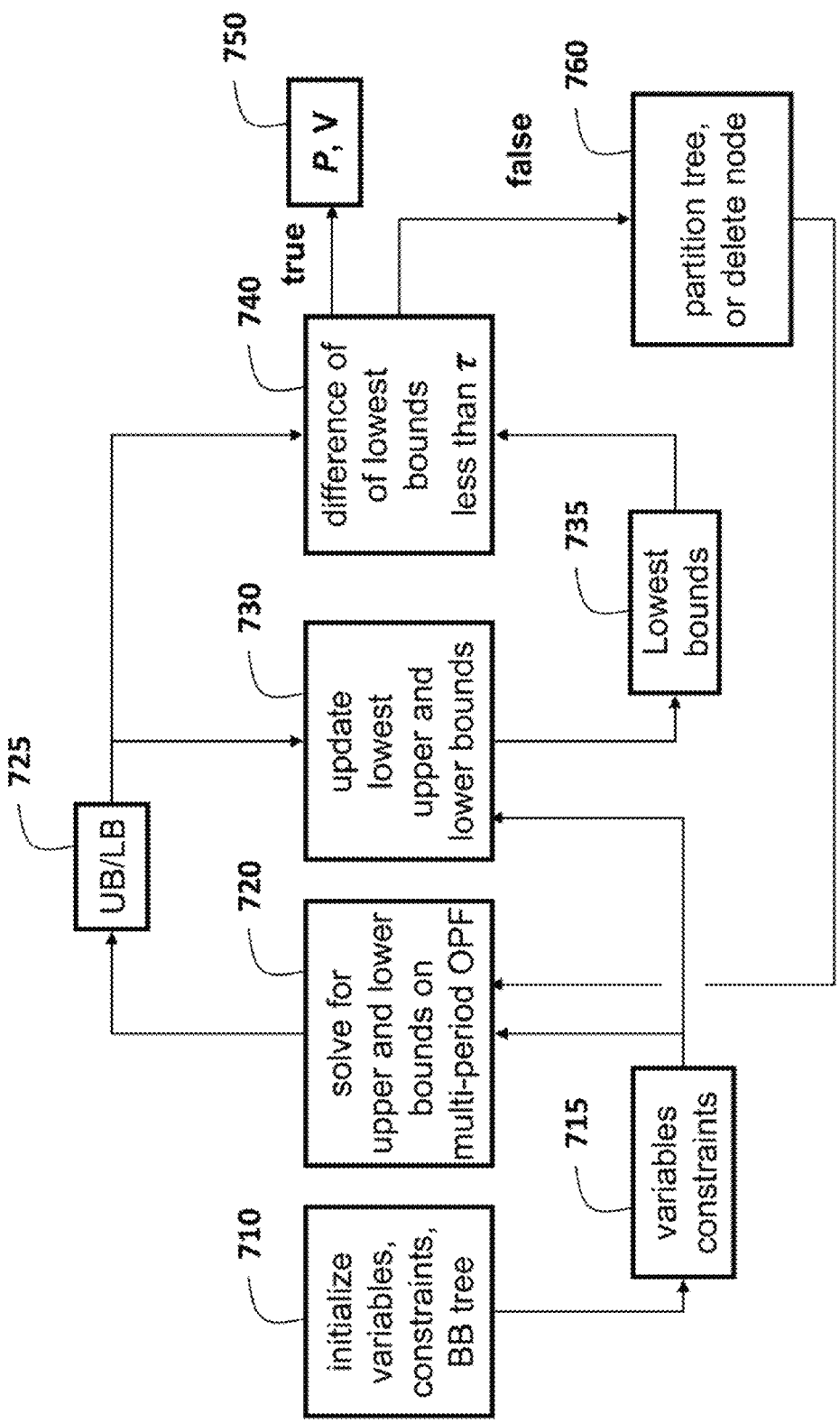
FIG. 7 is a flow diagram of a method according to embodiments of the invention.

FIG. 7 shows the steps of our method for a method for globally optimizing a power flow in electric power networks during multiple time periods of operation. We begin by initializing 710 variables and constraints 715 on the BB tree 200. Using the variables and constraints, we solve 720 upper and lower bounds 725 of the OPF, and update 730 the lowest upper and lower bounds 735. If a difference 740 of the lowest bounds is less than a threshold ξ, then we output the power P and voltage V 750. Otherwise, we partition 760 or delete the corresponding node in the BB tree, and repeat iterate at step 720.

In summary, the invented power flow optimization has the following advantages over the prior art. We consider the coupling between optimization problems that exist over time, particularly when using storage devices such batteries. We consider the coupling between problems that arise in successive time instants, particularly when switching equipment such as step voltage regulators, voltage transformers or capacitor banks are used. We also consider the coupling between problems that arise in successive time instants, particularly when power drawn from generating equipment are subject to ramp limits.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for optimizing a power flow in an electric power network by solving an optimization problem represented by an objective function, comprising the steps of:
   initializing variables and constraints of a branch and bound (BB) tree, wherein nodes in the BB tree represent feasible regions of the optimization problem;
   solving for upper and lower bounds on the objective function using the BB tree;
updating a lowest upper bound and a lowest upper bound;
   determining if a difference between the lowest lower bound and the lowest upper bound is less than a threshold;
   outputting the power flow based on the lowest lower bound and the lowest upper bound if true, and otherwise iterating beginning at the solving step until a termination condition is reached;
   controlling complex voltages at one or combination of buses, active and reactive power levels of generators, and energy storage device state-of-charge levels to control a state of the electric power network based on the output;
   wherein the steps are performed in a processor over multiple time periods that are coupled during operation of the electric power network, wherein the multiple time periods of operation of the electric network are due to limits on power generation, limits on voltage magnitude at buses ramp limits on the power generation, limits on rate of charge of batteries, limit on state-of-charge of batteries, and constraints on power transferred on the lines and thermal losses.

2. The method of claim 1, wherein the lower bounds are determined by semi-definite programming to provide lowest lower bound.

3. The method of claim 1, wherein the solving uses a Lagrangian decomposition method.

4. The method of claim 1, wherein the parameters for the optimizing include an admittance matrix based on a branch impedance and a bus fixed shunt admittance, and flow capacity ratings.

5. The method of claim 1, wherein the optimizing uses a decision function that depends on active power generation variables, reactive power generation variables, complex valued voltages, rate of charge of batteries, and battery state-of-charge levels at buses.

6. The method of claim 5, wherein the decision function is quadratic and strictly increasing.

7. The method of claim 1, wherein equality constraints, inequality constraints and bounds on decision variables to model limits of feasible operation of the network.

8. The method of claim 1, further comprising:
   modeling limits on power generation, limits on voltage magnitude at buses, ramp limits on power generation, limits on rate of charge of batteries, limit on state-of-charge of batteries, constraints on power transferred on lines.

9. The method of claim 1, wherein the upper bounds are determined by local minimization.

10. The method of claim 1, wherein the feasible regions are partitioned by rectangular bisection during the iterating.

11. The method of claim 1, wherein the feasible regions are partitioned by radial bisection during the iterating.

12. The method of claim 1, wherein the electric power network includes energy storage devices, and the multiple time periods are coupled to accommodate charging and discharging of the power storage devices at any particular time.

13. A method for optimizing a power flow in an electric power network by solving an optimization problem represented by an objective function, comprising, the steps of:
   initializing variables and constraints of a branch and bound (BB) tree, wherein nodes in the BB tree represent feasible regions of the optimization problem;
   solving for upper and lower bounds on the objective function using the BB tree;
updating a lowest upper bound and a lowest upper bound;
   determining if a difference between the lowest lower bound and the lowest upper bound is less than a threshold;
      outputting the power flow based on the lowest lower bound and the lowest upper bound if true, and otherwise iterating beginning at the solving step until a termination condition is readied;
   controlling complex voltages at one or combination of buses, active and reactive power levels of generators, and energy storage device state-of-charge levels to control a state of the electric power network based on the output;
   wherein the steps are performed in a processor over multiple time periods that are coupled during operation of the electric power network, wherein the multiple time periods of operation of the electric network are due to step voltage regulators, capacitor banks, and limits on frequent change in settings between subsequent time steps.

* * * * *